Figure 1:
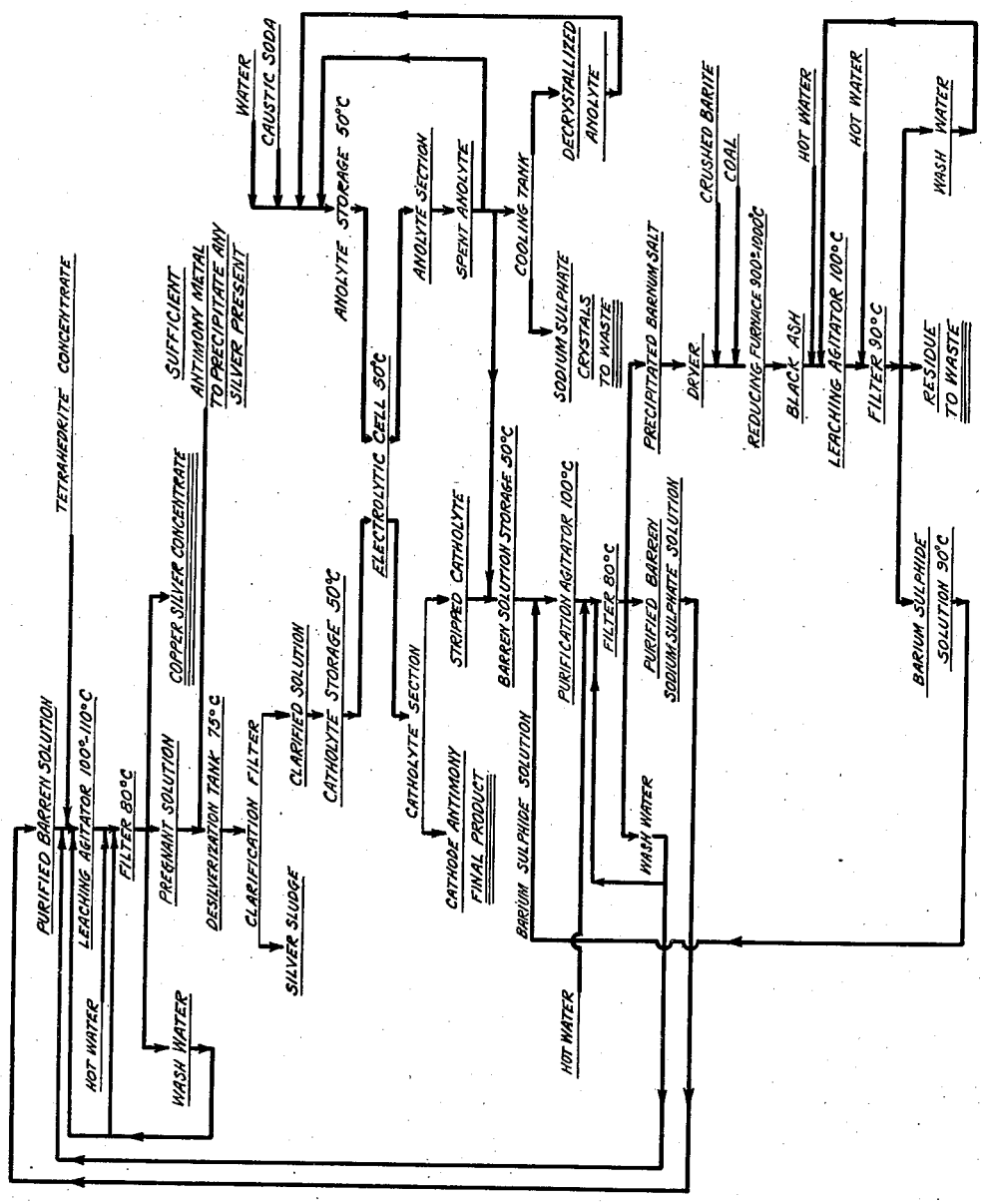

Oct. 12, 1943.   W. C. HOLMES   2,331,395
ELECTROLYTIC RECOVERY OF METALS
Filed Oct. 10, 1940

Inventor
W. C. Holmes
By Bacon & Thomas
Attorneys

Patented Oct. 12, 1943

2,331,395

UNITED STATES PATENT OFFICE 2,331,395

ELECTROLYTIC RECOVERY OF METALS

William Church Holmes, Kellogg, Idaho, assignor to Sunshine Mining Company, Kellogg, Idaho, a corporation Application October 10, 1940, Serial No. 360,658

8 Claims. (Cl. 204—105)

This invention relates to the recovery of metals and more particularly to the recovery of metals of the group referred to in qualitative chemical analysis as the tin group, namely, mercury, arsenic, antimony and tin. The process is particularly adapted to the recovery of antimony and will be described in detail with reference to this metal. However, it is to be understood that the process may also be applicable to the recovery of the other named metals.

The process is particularly applicable to the extraction of these metals from ores containing them in the form of sulfides. However, the process is equally as applicable to the extraction of these metals from any materials which contain them in the form of sulfides. With reference to the recovery of antimony, this process has particular applicability to the extraction of that metal from argentiferrous tetrahedrite. The latter material is a complex sulfide of silver, copper and antimony.

To the best of my knowledge, argentiferrous tetrahedrite has never been previously decomposed for the commercial recovery of antimony without a preliminary heat treatment involving either roasting or fusion. Due to the methods of treatment in vogue at smelters, for this type of material, it is customary for them to charge high penalties for the antimony content of tetrahedrite ores and concentrates. Thus, the owner of such products not only receives no credit for their valuable antimony content, but actually finds the value of his products seriously diminished thereby.

Various prior art attempts have been made to extract antimony from its sulfide ores by means of alkaline sulfide solutions. It is very well known that antimony sulfide is soluble in alkaline sulfide solutions. Such prior art attempts have never been commercially feasible because, among other things, no one had ever devised a successful method for regenerating the sulfide solution. Due to the fact that the sulfide solution oxidizes in the leaching and electrolysis steps, impairing its efficiency, it was necessary to reject a portion of the solution from time to time and replace it with fresh sulfide solution and thus the cost became prohibitive.

In the present invention I have devised a method whereby the above mentioned metals may be recovered from their ores by the hydrometallurgical method and whereby the extracting solution may be regenerated in a manner to make the process commercially feasible.

It is, therefore, an object of the present invention to provide a process for the extraction of the tin group metals from materials containing them in the sulfide form and for the regeneration of the extracting solution.

It is another object of my invention to provide for the extraction of antimony from argentiferrous tetrahedrite concentrates by the hydrometallurgical method and for the regeneration of the extracting solution.

It is another object of the present invention to provide a process for the extraction of arsenic and antimony from smelting by-products, such as flue dust, in which the metals are present as oxides and for the regeneration of the extracting solution.

It is another object of the present invention to provide a process for the extraction of antimony from the product or products obtained from the roasting of antimony bearing ores or concentrates, the antimony being present in an oxidized form and for the regeneration of the extracting solution.

It is another object of the present invention to provide a process for the extraction of antimony contained in the product or products resulting from the fusion of antimony bearing materials in the presence of sulfur and for the regeneration of the extracting solution. The most suitable of these fused products are known as matte and speise.

It is a further object of my invention to provide a process for the extraction of antimony contained in solutions resulting from leaching materials containing antimony including antimony ores and concentrates in their natural state, roasted ores, mattes, speise, products resulting from the fusion of antimony bearing materials and products resulting from the fusion of antimony bearing materials with other materials and the regeneration of these leaching solutions.

It is a further object of the present invention to provide a process for the regeneration of the oxidized compounds of an alkaline sulfide solution, such as the sulfate, thiosulfate, sulfite and carbonate salts of the alkali metal, back to the sulfide condition.

It is a further object of the present invention to provide a cyclic process for the regeneration of the oxidized compounds of an alkaline sulfide solution, such as the sulfate, thiosulfate, sulfite and carbonate salts of the alkali metal, back to the sulfide condition and for the reduction by a heat treatment of the recovered precipitated salts from this regeneration to obtain a product that may be used to regenerate a following batch of oxidized alkaline sulfide solution.

It is a further object of my invention to provide a continuous method of carrying out these extractions and regenerations.

The invention will be described with reference to the recovery of antimony from argentiferrous tetrahedrite, and in connection with the attached drawing which is a flow sheet illustrating a specific embodiment of the process.

The recovery of antimony from argentiferrous tetrahedrite has been selected as illustrative of the invention since this presents the embodiment of greatest industrial importance at present. However, its applicability to the treatment of other materials referred to above is to be understood.

As will be seen from the flow sheet, the process includes dissolving antimony in an alkaline sulfide solution, separating the solution from the insolubles, precipitating the antimony, and regenerating the leaching solution by means of a solution of a soluble sulfide of a cation whose sulfate, thiosulfate, sulfite, and carbonate are substantially insoluble in the alkaline sulfide solution.

More specifically, the process includes leaching the argentiferrous tetrahedrite concentrate or other material in finely divided condition with an alkaline sulfide solution. The alkaline sulfide solutions can be either the mono-sulfide or the polysulfide or a mixture of both of sodium, potassium or ammonium. With the use of sodium sulfide as the solvent this results in the formation of sodium thio-antimonite, while the use of sodium polysulfide as the solvent results in the formation of sodium thio-antimonate dissolved in the sulfide solution. The resultant solution hereinafter is called the pregnant solution. I prefer to keep the amount of polysulfide present in the leaching solution at a minimum as the presence of thio-antimonate in the pregnant solution lowers the current efficiency of the electrolytic antimony deposition. The copper and silver are substantially insoluble in the sulfide solution and remain behind to be treated by conventional methods for the recovery of copper and silver.

The pregnant solution is filtered or otherwise separated from the insoluble residue, the latter being washed with wash water from a previous leach, followed by a washing with water much in the conventional manner of washing filter cakes. The first wash water contains an appreciable amount of solubles and can be added to the pregnant solution or it may be recycled as desired.

The pregnant solution is then electrolyzed, preferably in a diaphragm cell disclosed in my application, Ser. No. 360,659, filed October 10, 1940. As a diaphragm, a sheet of asbestos paper interposed between two sheets of canvas, the whole stitched together to give a quilted effect, has been found satisfactory. When new, these diaphragms are porous and allow some mixing of the anode and cathode electrolytes. This may be obviated by forming a precipitate in the pores of the diaphragm as by soaking it in a solution of soluble sulfate, such as, sodium sulfate, and thereafter immersing it in a solution of a soluble barium salt, such as, barium sulfide, thus precipitating barium sulfate in the pores of the diaphragm. A single sheet of heavy cotton duck may be used as the diaphragm or a sheet of microporous rubber would be satisfactory.

A caustic soda solution is used in the anode compartment and is called the anolyte. The pregnant solution is used in the cathode compartment and is called the catholyte. Metallic antimony is precipitated on the cathodes and can be removed therefrom and refined by ordinary thermal methods.

In the cathode compartment of the cell as electrolysis proceeds sodium ions migrate to the cathode where they give up their charge and form metallic sodium. This metallic sodium immediately reacts with water to form caustic soda and free hydrogen, the latter immediately reacting with the thio-antimonite and thio-antimonate ions, reducing the antimony to the metallic state and freeing the sulfide ions. Some of these sulfide ions react with the sodium ions forming sodium sulfide and some migrate to the anode compartment where they give up their charge and enter into the anodic reaction.

In the anode compartment the hydroxyl ions migrate to the anode, liberating oxygen. This oxygen reacts with the sulfide ions which have migrated into the anode compartment from the cathode compartment oxidizing them through the various oxidation stages of sulfur finally forming sodium sulfate. If the caustic soda concentration is sufficient the reaction will stop at this point. However, if the caustic soda concentration drops too low, sulfuric acid will form at the anode surface which will react with the various sodium, sulfur and antimony salts in solution precipitating elemental sulfur and antimony sulfide and evolving hydrogen sulfide.

In the course of the extraction and the electrolysis the sulfide in the catholyte is, to a considerable extent, oxidized to the sulfite, the sulfate and the thio-sulfate condition. In addition, a certain amount of sodium carbonate has been formed. These compounds are of no value as a solvent for the antimony in the tetrahedrite concentrates, and, therefore, for a practical process, it is necessary that these products be regenerated to the sulfide state.

This forms the most important part of my invention and is accomplished by allowing the above named salts to build up in the leaching solution, to some extent, but not far enough to impair the efficiency of the process. A barium sulfide solution is then added under suitable conditions of heat and volume and the two solutions are thoroughly mixed together.

The barium ions of the barium sulfide combine with the sulfate, thiosulfate, sulfite and carbonate ions of the oxidized salts of the sodium, forming the corresponding insoluble or relatively insoluble salts of barium. The sulfide sulfur ions of the barium sulfide combine with the sodium ions of the oxidized salts regenerating the latter to sodium sulfide. A preferred concentration of the barium sulfide solution is one that will contain between 150 and 300 grams of barium sulfide per liter, but any suitable concentration may be used.

The reactions are as follows:

1. $Na_2SO_4 + BaS \rightarrow Na_2S + BaSO_4$ (ppt.)
2. $Na_2S_2O_3 + BaS \rightarrow Na_2S + BaS_2O_3$ (ppt.)
3. $Na_2SO_3 + BaS \rightarrow Na_2S + BaSO_3$ (ppt.)
4. $Na_2CO_3 + BaS \rightarrow Na_2S + BaCO_3$ (ppt.)

The resulting sodium sulfide solution is then separated by settlement or filtration or both according to standard methods and the precipitated barium salts recovered.

I prefer to regenerate the stripped catholyte from the electrolytic cell after mixing it with a portion of the fouled anolyte, but I wish it to be understood that the catholyte and the anolyte may be regenerated separately and at any desired point in the cycle without departing from the spirit of the invention.

It is to be noted that all of these reactions depend upon the fact that the barium salts of the undesirable anions are insoluble, thereby making it possible to use barium sulfide which has an appreciable solubility to convert the sodium compounds into sulfides and precipitate the undesirable anions.

I prefer to carry on the regeneration by mixing with the stripped catholyte a solution of barium sulfide rather than by the addition of solid barium sulfide. If the solid were used, any insoluble residue therefrom would become mixed with the precipitate and would interfere with the subsequent regeneration of the barium precipitate. However, while less satisfactory, the solid can be used if desired.

It has been found that an excess of barium sulfide is undesirable since the presence of barium sulfide in the regenerated catholyte tends to precipitate some of the antimony salts. In order to avoid this, I may carry on the regeneration so as to end with a slight deficiency of barium sulfide. That is, I may avoid this difficulty by not quite completely regenerating the catholyte.

The regenerated sulfide solution is then returned for use in extracting another batch of concentrate. The recovered precipitated barium salts are either dried or not as is desired and then mixed with some carbonaceous material, preferably coal, and sufficient ground barite or barium sulfate to make up for any losses of barium sulfide in the regeneration cycle. The resulting mixture is then subjected to a heat treatment at a temperature of from 800 to 1,000° C. under reducing conditions whereby the barium sulfate, barium thiosulfate and barium sulfite are reduced to barium sulfide, which is in a calcined product known as black ash. In order to cut down dusting while charging the furnace and during the heat treatment, I may mix the precipitated barium salts with a combustible liquid of high viscosity containing a non-volatile residue. A tar from the destructive distillation of any carbonaceous material, such as, gas tar from the manufacture of artificial gas, or still bottoms from an oil refinery, are satisfactory.

The reduced product is black ash which is then extracted with hot water to yield a solution of barium sulfide which solution can be used to regenerate another batch of stripped catholyte or anolyte or a mixture of both.

As was previously described the anolyte is composed originally of a caustic soda solution and in the course of electrolysis some of the sulfide ions migrate through the diaphragms into the anolyte and are there oxidized through various stages eventually to the sulfate condition. This sulfate ion unites with a sodium ion to form sodium sulfate and as a result thereof the alkalinity of the anolyte is reduced. This reduction in alkalinity is also partly due to the migration of the sodium ions from the anolyte to the catholyte. Eventually it becomes necessary to add more caustic soda to maintain the alkalinity of the anolyte. Likewise, the concentration of the sodium sulfate builds up to such an extent as to increase the voltage drop between the anodes and cathodes and to be generally troublesome by crystallizing out of the solution. When this stage is reached I may remove a portion of the anolyte and cool it sufficiently to crystallize out a substantial portion of the sodium sulfate after which the anolyte may be returned to the anode compartment. Instead of doing this, I may remove a portion of the anolyte and add it to the stripped catholyte so that it is absorbed in the leaching circuit, the sulfate being precipitated as barium sulfate during the course of the regeneration of the catholyte.

The decision as to whether the fouled anolyte will be absorbed in the leaching circuit or not is determined by the volume, alkalinity, and sulfur content of the solution in the leaching circuit. There is a loss of sodium sulfide in the leaching step and this loss is made up by regenerating part of the spent anolyte. Any excess sulfur that should build up in the circuit may be removed by the crystallization of sodium sulfate from the anolyte. Therefore, part of the anolyte will be absorbed in the leaching circuit and part will be decrystallized. My experience has indicated that the bulk of the fouled anolyte will be absorbed in the leaching circuit.

Silver sulfide is substantially insoluble in the alkaline sulfide leaching solution. However, it is more soluble than is the copper sulfide. I have found that antimony recovered as described above from argentiferrous tetrahedrite contains from six to ten ounces of silver per ton. I may remove this silver by precipitating it from the pregnant solution by means of metallic antimony. As is well known, metals higher in the electromotive series may be used to precipitate from a solution a metal lower in the electromotive series. I take advantage of this in precipitating the silver. It is quite apparent that any metal above silver in the electromotive series soluble in the sulfide solution could be used but I prefer to use antimony since the antimony in precipitating the silver dissolves in the leaching solution and can be separated with the other antimony. Other metals might present problems in separation. This precipitation of the silver may or may not be employed, as desired.

*Example*

3 kilograms of tetrahedrite concentrate were leached in 6 liters of a leaching solution containing approximately 125 grams of sulfur per liter, most of which was present in the form of sodium sulfide. The solution had an alkalinity equivalent to about 250 grams per liter in terms of caustic soda at the start of the leach. The mixture of solution and concentrate was heated by means of a steam jacket and was agitated in a steel tank for a period of about three hours. A temperature of 100° C. to 110° C. was maintained for this period.

At the end of this time sufficient water had evaporated so that the mixture almost solidified. When the mixture reached this stage, fresh leaching solution was added in an amount equal to about 110 to 120% of that previously added. In the instant case, 7 liters of leaching solution were added at this point. The tank was then covered to cut down on further evaporation, and the temperature was maintained within about the same range. After about two hours, the extraction was substantially complete and the leaching solution contained approximately 350 grams per liter of sodium sulfide. During the operation thus far, approximately 1.67 liters of solution were evaporated per kilogram of concentrate.

The mixture was then diluted with wash waters from the filtration of a previous leach to an alkalinity equivalent to approximately 275 grams per liter of caustic soda. This dilution improved the filtration step. After dilution the mixture was filtered, and the filter cake washed first with a wash water from a previous filtration which wash water was absorbed in the pregnant solution until the alkalinity of the latter dropped to approximately 250 grams per liter in terms of caustic soda. After the alkalinity of the pregnant solution dropped to the desired strength the wash waters were drawn to storage tanks for use in diluting the pulp and washing the residue from the following leach. Following the above cycle, the pregnant solution volume was about 4 liters per kilogram of concentrate leached and contained about 60 grams per liter of antimony, most of which was in the form of sodium thio-antimonite and only a small part as sodium thio-antimonate.

To this pregnant solution sufficient antimony was added to precipitate the silver which was removed by settlement and filtration. The clarified pregnant solution was then conducted to a special diaphragm electrolytic cell operated at approximately 50° C. where it was subjected to electrolysis.

The stripped catholyte was regenerated by means of a hot solution of barium sulfide containing between 150-300 grams barium sulfide per liter. This operation was carried on at approximately 100° C. The precipitated oxidation products were filtered and the cake washed with wash water from a previous operation and with fresh water. The wash water can be used to dilute the regenerated catholyte or can be used as wash water to wash the filter cake from the antimony extraction. The filter cake from the regeneration was dried and mixed with crushed coal and some ground barite and reduced to barium sulfide under reducing conditions in a furnace. The black ash resulting from the reduction was leached with hot water and filtered to yield a hot barium sulfide solution which can be used for a subsequent regeneration.

The anolyte at the beginning of the operation was a water solution of caustic soda having an alkalinity of about 100 grams per liter of caustic soda. After repeated use the anolyte built up a considerable concentration of sodium sulfate. Part of the anolyte was cooled to about 5 to 10° C. whereupon considerable sodium sulfate crystallized from the solution and was removed. The decrystallized anolyte was then returned to the anode compartment after the addition of caustic soda or not as the conditions demanded.

While the above example has treated the individual steps separately, I wish it understood that the process may be made continuous by providing suitable apparatus, such as storage bins, agitator tanks, storage tanks, filters, furnaces, electrolytic cells and pumps to contain and circulate the solution and products, to operate all the various steps in their proper sequence and at the same time, thus having a continuous cyclic process.

While the process has been specifically described with reference to the recovery of antimony from a tetrahedrite concentrate, it is equally applicable to the recovery of antimony from other sources, as, for example, from stibnite, or antimony bearing materials produced by roasting or fusion or as products or by-products of smelting operations. As stated, the invention has been found to be peculiarly useful in connection with the recovery of antimony, and particularly from a tetrahedrite concentrate, and, accordingly, the specification has been addressed specifically to the recovery thereof in accordance with my new process. It is nevertheless believed that the invention may have utility with varying degrees of success in connection with the recovery of mercury from such materials as cinnabar. The same is true with respect to the recovery of arsenic which may be recovered from its sulphide ores such as realgar and arsenical pyrites. Furthermore, the invention probably has some utility in the recovery of tin from sources in which the tin is present as a sulphide.

As used herein, the term alkali metal is meant to include sodium, potassium and ammonium. While various specific embodiments of the invention have been described, it is to be understood that the invention is not limited thereto but merely by the appended claims.

I claim:

1. The process of recovering antimony from tetrahedrite concentrate which comprises contacting said concentrate with a solution of an alkali metal sulfide, electrolyzing said solution in a diaphragm cell utilizing said solution as the catholyte and a solution of a caustic alkali as the anolyte, whereby oxidation products of said sulfide are formed in said catholyte and anolyte, regenerating said sulfide solution by means of a barium sulfide and adding at least a portion of said anolyte to said catholyte before said regeneration, whereby the oxidation products in said anolyte are regenerated along with the oxidation products in said catholyte to form regenerated alkali metal sulfide.

2. The process of recovering antimony from tetrahedrite concentrate which comprises contacting said concentrate with a solution of an alkali metal sulfide, electrolyzing said solution in a diaphragm cell utilizing said solution as the catholyte and a solution of a caustic alkali as the anolyte, whereby oxidation products of said sulfide are formed in said catholyte and anolyte including alkali metal sulfate in said anolyte, regenerating said sulfide solution by means of a barium sulfide to form regenerated catholyte and cooling a portion of said anolyte to crystallize an alkali metal sulfate, removing said crystals from said anolyte and returning said anolyte to said cell.

3. The process of recovering antimony from tetrahedrite concentrate which comprises contacting said concentrate with a solution of an alkali metal sulfide, electrolyzing said solution in a diaphragm cell utilizing said solution as the catholyte and a solution of a caustic alkali as the anolyte, whereby oxidation products of said sulfide are formed in said catholyte and anolyte including alkali metal sulfate in said anolyte, regenerating said sulfide solution by means of a barium sulfide, adding a portion of said anolyte to said catholyte before said regeneration, whereby the oxidation products in said anolyte are regenerated along with the oxidation products in said catholyte to form regenerated alkali metal sulfide solution, and cooling another portion of said anolyte to crystallize an alkali metal sulfate, removing said crystals from said anolyte and returning said anolyte to said cell.

4. The process of recovering antimony from materials containing the same, which comprises, dissolving the antimony in a leaching solution of an alkali metal sulfide, electrolyzing said solution in a diaphragm cell utilizing said solution as the catholyte and a solution of caustic alkali as the anolyte to deposit said antimony on the cathode of said cell and produce a spent leaching solution containing oxidation products of said sulfide in said spent solution, regenerating said spent solution with barium sulfide to precipitate said oxidation products as insoluble compounds of barium and reform alkali metal sulfide, separating said precipitate from the resulting solution to produce regenerated leaching solution, mixing said precipitate with a carbonaceous material and subjecting the resulting mixture to a temperature sufficiently high to reduce said insoluble compounds of barium to barium sulfide and utilizing said last mentioned barium sulfide for again regenerating spent leaching solution.

5. The process of recovering antimony from materials containing the same, which comprises, dissolving the antimony in a leaching solution of an alkali metal sulfide, electrolyzing said solution in a diaphragm cell utilizing said solution as the catholyte and a solution of caustic alkali as the anolyte to deposit said antimony on the cathode of said cell and produce a spent leaching solution containing oxidation products of said sulfide in said spent solution, regenerating said spent solution with barium sulfide to precipitate said oxidation products as insoluble compounds of barium and reform alkali metal sulfide, separating said precipitate from the resulting solution to produce regenerated leaching solution, mixing said precipitate with a combustible carbonaceous liquid of high viscosity and subjecting the resulting mixture to a temperature sufficiently high to reduce said insoluble compounds of barium to barium sulfide and utilizing said last mentioned barium sulfide for again regenerating spent leaching solution.

6. The process of recovering antimony from materials containing the same, which comprises, contacting said materials with a solution of an alkali metal sulfide, electrolyzing said solution in a diaphragm cell utilizing said solution as a catholyte and a solution of caustic alkali as the anolyte, whereby oxidation products of said sulfide are formed in said catholyte and anolyte, regenerating said sulfide solution by means of barium sulfide and adding at least a portion of said anolyte to said catholyte before said regeneration, whereby the oxidation products in said anolyte are regenerated along with the oxidation products in said catholyte to form regenerated alkali metal sulphide.

7. The process of recovering antimony from materials containing the same, which comprises, contacting said materials with a solution of an alkali metal sulfide, electrolyzing said solution in a diaphragm cell utilizing said solution as the catholyte and a solution of caustic alkali as the anolyte, whereby oxidation products of said sulfide are formed in said catholyte and anolyte including alkali metal sulfate in said anolyte, regenerating said sulfide solution by means of a barium sulfide to form regenerated alkali metal sulfide solution, cooling a portion of said anolyte to crystallize an alkali metal sulfate, removing said crystals from said portion of said anolyte and returning said portion to said cell.

8. The process of recovering antimony from materials containing the same, which comprises, contacting said materials with a solution of an alkali metal sulfide, electrolyzing said solution in a diaphragm cell utilizing said solution as the catholyte and a solution of caustic alkali as the anolyte, whereby oxidation products of said sulfide are formed in said catholyte and anolyte including alkali metal sulfate in said anolyte, regenerating said sulfide solution by means of a barium sulfide, adding a portion of said anolyte to said catholyte before said regeneration, whereby the oxidation products in said anolyte are regenerated along with the oxidation products in said catholyte to form regenerated alkali metal sulfide solution, and cooling another portion of said anolyte to crystallize an alkali metal sulfate, removing said crystals from said other portion of anolyte and returning said other portion of said anolyte to said cell.

WILLIAM CHURCH HOLMES.